(12) United States Patent
Yu et al.

(10) Patent No.: US 7,916,966 B2
(45) Date of Patent: Mar. 29, 2011

(54) SYSTEM AND METHOD FOR CONTRAST EXTENSION ADJUSTMENT AND OVERFLOW COMPENSATION OF IMAGE SIGNAL

(75) Inventors: Yi-Sheng Yu, Taoyuan (TW); Hsu-Pin Kao, Pingjhen (TW); Yi-Chia Shan, Jhongli (TW); Tsan-Hung Tsai, Sanchong (TW)

(73) Assignee: Marketech International Corp., Taipei (TW)

( * ) Notice: Subject to any disclaimer, the term of this patent is extended or adjusted under 35 U.S.C. 154(b) by 957 days.

(21) Appl. No.: 11/812,039

(22) Filed: Jun. 14, 2007

(65) Prior Publication Data

US 2007/0297690 A1    Dec. 27, 2007

(30) Foreign Application Priority Data

Jun. 23, 2006    (TW) .............................. 95122841 A

(51) Int. Cl.
  G06K 9/40    (2006.01)
  G06K 9/38    (2006.01)
(52) U.S. Cl. ........................................ 382/274; 382/270
(58) Field of Classification Search .................... 382/274
   See application file for complete search history.

(56) References Cited

U.S. PATENT DOCUMENTS

| | | | | |
|---|---|---|---|---|
| 5,034,990 A * | 7/1991 | Klees | ............................ | 382/252 |
| 5,677,644 A * | 10/1997 | Silverbrook et al. | ......... | 327/131 |
| 5,686,960 A * | 11/1997 | Sussman et al. | ........... | 348/218.1 |
| 5,784,491 A * | 7/1998 | Koga | ........................... | 382/232 |
| 6,101,272 A * | 8/2000 | Noguchi | ...................... | 382/167 |
| 6,633,684 B1 * | 10/2003 | James | ........................... | 382/274 |
| 6,782,076 B2 * | 8/2004 | Bowen et al. | .................. | 378/74 |
| 6,996,249 B2 * | 2/2006 | Miller et al. | .................. | 382/100 |
| 2001/0033697 A1 * | 10/2001 | Shimada | ....................... | 382/246 |
| 2004/0066973 A1 * | 4/2004 | Prakash et al. | ................ | 382/239 |
| 2004/0184670 A1 * | 9/2004 | Jarman et al. | ................. | 382/274 |
| 2005/0129271 A1 * | 6/2005 | Shi et al. | ....................... | 382/100 |
| 2006/0098858 A1 * | 5/2006 | Guittet | ........................... | 382/133 |

\* cited by examiner

*Primary Examiner* — David P Rashid
(74) *Attorney, Agent, or Firm* — Bacon & Thomas, PLLC

(57) ABSTRACT

This invention provides a system and method for image signal contrast extension and overflow compensation. The system includes contrast extension and overflow compensation look-up tables, an image gray level boundary determining unit, a contrast extension unit, an overflow judging unit, and an overflow compensation unit. The image gray level boundary determining unit defines a maximum and a minimum among the gray levels of the pixels of an image signal and calculates the difference. The contrast extension unit selects corresponding parameter from the contrast extension table for contrast extension of a given image pixel. The overflow judging unit judges whether the pixels are overflowed. The overflow compensation unit compensates the pixel. When a pixel is overflowed, the overflow compensation unit selects, according to the gray level of the pixel, a corresponding overflow compensation parameter to reduce the gray level to overcome the problem of overflow.

7 Claims, 9 Drawing Sheets

| Current Input Gray Scale Value (11-bit) (P) | Current Input Gray Scale Value (8-bit) (P) | Raw Output Gray Scale Value (10-bit) | Overflow Compensation Gain Value (Gain) | Compensated Output Gray Scale Value (18-bit) (P * Gain) | Compensated Output Gray Scale Value (10-bit) (P * Gain) |
|---|---|---|---|---|---|
| 1024 | 256 | 1023 | 254 | 260096 | 1016.0 |
| 1025 | 256 | 1023 | 254 | 260350 | 1017.0 |
| 1026 | 256 | 1023 | 254 | 260604 | 1018.0 |
| 1027 | 256 | 1023 | 254 | 260858 | 1019.0 |
| 1028 | 257 | 1023 | 254 | 261112 | 1020.0 |
| 1029 | 257 | 1023 | 254 | 261366 | 1021.0 |
| 1030 | 257 | 1023 | 254 | 261620 | 1022.0 |
| 1031 | 257 | 1023 | 254 | 261874 | 1022.9 |
| 1032 | 258 | 1023 | 252 | 260064 | 1015.9 |
| 1033 | 258 | 1023 | 252 | 260316 | 1016.9 |
| 1034 | 258 | 1023 | 252 | 260568 | 1017.8 |
| 1035 | 258 | 1023 | 252 | 260820 | 1018.8 |
| 1036 | 259 | 1023 | 252 | 261072 | 1019.8 |

Note: 2^18=262,144

| Current Input Gray Scale Value (11-bit) ( P ) | | | | Current Input Gray Scale Value (8-bit) ( P ) | | | Traditional Output Gray Scale Value (10-bit) | | | Overflow Compensation Gain Value (Gain) | Compensated Output Gray Scale Value according to the Invention (10-bit) (P*Gain) | | |
|---|---|---|---|---|---|---|---|---|---|---|---|---|---|
| R | G | B | Max. | R | G | B | R | G | B | | R | G | B |
| 1024 | 800 | 600 | 1024 | 256 | 200 | 150 | 1023 | 800 | 600 | 254 | 1016.0 | 793.8 | 595.3 |
| 1025 | 800 | 600 | 1025 | 256 | 200 | 150 | 1023 | 800 | 600 | 254 | 1017.0 | 793.8 | 595.3 |
| 1026 | 800 | 600 | 1026 | 256 | 200 | 150 | 1023 | 800 | 600 | 254 | 1018.0 | 793.8 | 595.3 |
| 1027 | 800 | 600 | 1027 | 256 | 200 | 150 | 1023 | 800 | 600 | 254 | 1019.0 | 793.8 | 595.3 |
| 1028 | 800 | 600 | 1028 | 257 | 200 | 150 | 1023 | 800 | 600 | 254 | 1020.0 | 793.8 | 595.3 |
| 1029 | 800 | 600 | 1029 | 257 | 200 | 150 | 1023 | 800 | 600 | 254 | 1021.0 | 793.8 | 595.3 |
| 1030 | 800 | 600 | 1030 | 257 | 200 | 150 | 1023 | 800 | 600 | 254 | 1022.0 | 793.8 | 595.3 |
| 1031 | 800 | 600 | 1031 | 257 | 200 | 150 | 1023 | 800 | 600 | 254 | 1022.9 | 793.8 | 595.3 |
| 1032 | 800 | 600 | 1032 | 258 | 200 | 150 | 1023 | 800 | 600 | 252 | 1015.9 | 787.5 | 590.6 |
| 1033 | 800 | 600 | 1033 | 258 | 200 | 150 | 1023 | 800 | 600 | 252 | 1016.9 | 787.5 | 590.6 |
| 1034 | 800 | 600 | 1034 | 258 | 200 | 150 | 1023 | 800 | 600 | 252 | 1017.8 | 787.5 | 590.6 |
| 1035 | 800 | 600 | 1035 | 258 | 200 | 150 | 1023 | 800 | 600 | 252 | 1018.8 | 787.5 | 590.6 |
| 1036 | 800 | 600 | 1036 | 259 | 200 | 150 | 1023 | 800 | 600 | 252 | 1019.8 | 787.5 | 590.6 |

SYSTEM AND METHOD FOR CONTRAST EXTENSION ADJUSTMENT AND OVERFLOW COMPENSATION OF IMAGE SIGNAL

BACKGROUND OF THE INVENTION

1. Field of the Invention

The present invention relates to a system and a method for image signal processing; in particular, it is for a system and a method for contrast extension and overflow compensation of an image signal.

2. Description of the Prior Art

Among the known video image products or components, there are frequent needs for adjusting the quality of images by using image processing. For example, the brightness function, the contrast function, the hue function, and the saturation function designed for a TV set are provided to consumers for adjusting the image quality in accordance with personal preferences. However, the problem that is frequently encountered by consumers is that after the image is adjusted by use of the selections in the functions, the phenomenon of a large area of saturated transparency of the image arises. That is to say, different levels of brightness in the image or the colors previously distinguishable can no longer be distinguished in the original levels of brightness or color deviations after the image or the colors are adjusted to full brightness, causing the phenomena of overflow of the saturated gray scale. That means the gray scale values have reached the maximum value, and their original levels can no longer be distinguished.

In another example, most video processing IC provides many types of video adjusting and enhancing functions for designers to find the most optimum adjustment settings. However, after several levels of processing of the image, the phenomenon of saturated overflow frequently occurs, causing the image ultimately appearing on the display to show a large area of transparency, thus affecting the viewing quality.

Current solutions are mostly carried out as a simple countermeasure on image overflow by limiting image gain value during processing, so as to reduce the possibility of generating image saturation as much as possible. However, image signals always go through more than one level of processing, and if the image signals go through several levels of adjustments and enhancement processing, the number of gray scales of the image decreases, causing the problem where the image continuously has an incomplete contour, and the overall brightness is lowered, thus resulting in a poor contrast.

Furthermore, in order to prevent overflow from occurring, the gain value is usually limited to lower than 1.0 when the image signal is being processed; therefore, after several levels of image processing, the gray scale value of the image becomes smaller and smaller, and the contrast of the image becomes poorer and poorer. For example, the maximum range of the gray scale value of the 256 gray scales of an 8-bit image is 0-255. Due to the fact that the nature of the utilized components, parameter settings, decayed signal transmission, decayed dissection, suppression of noisy signals, and image signal processing can all affect the range of image gray scales in practical applications of video systems, the image gray scales cannot fully utilize the 256 gray scales, causing the dynamic range of the image signal to decrease, the brightness of color levels to lower, and the contrast to be poorer. Thus, the viewing quality is affected.

Accordingly, a scope of the invention is to provide a processing system and a processing method for contrast extension and overflow compensation of an image signal, and more particularly, after the number of gray scales of an image signal has dropped or an overflow has occurred after the image signal has gone through several times of preprocessing, the image signal can be automatically adjusted to prevent the problems described above from happening.

SUMMARY OF THE INVENTION

A scope of the invention is to provide a processing system and a processing method for contrast extension and overflow compensation of an image signal.

Another scope of the invention is to provide a processing system and a processing method for contrast extension and overflow compensation of an image signal to prevent a decrease in the number of gray scales and occurrence of overflow after the image signal has gone through several levels of adjustments and enhancement processing. The image signal can also be automatically adjusted.

The system for contrast extension and overflow compensation of an image signal, according to a preferred embodiment of the invention, includes an image signal contrast extension module and an image signal overflow compensation module. Each of the two modules includes a memory and an image signal processor.

The memory of the contrast stretching module stores a predetermined contrast extension look-up table, which includes a set of offset values and a set of gain values. The image signal processor of the contrast extension module includes an image gray scale boundary determining unit and a contrast extension unit. The contrast extension unit is used for processing the gray scale value of the image signal by contrast extension. The image gray scale boundary determining unit is used for determining the maximum gray scale value and the minimum gray scale value of the image; after the two values are determined, the contrast extension unit selects the corresponding offset value and the corresponding gain value from the contrast extension look-up table according to the maximum and minimum gray scale value, so as to calculate the respective new gray scale value of each of the pixels of the image to reach the effect of a strong contrast.

The memory of the overflow compensation module stores a predetermined overflow compensation look-up table. The image signal processor of the overflow compensation module includes an overflow judging unit and an overflow compensation unit. The overflow judging unit judges, according to the gray scale value of the pixel, whether the pixel of the image signal is overflowed. If the overflow judging unit judges that one of the pixels of image is overflowed, the overflow judging unit selects, according to the gray scale value of the pixel, the corresponding overflow compensation parameter from the overflow compensation look-up table to lower the gray scale value of the pixel, so as to overcome the problem of overflow.

A processing method for contrast extension and overflow compensation of an image signal, according to a preferred embodiment of the invention, includes a contrast extension part and an overflow compensation part. The procedure of contrast extension of an image signal includes the following steps. A predetermined contrast extension offset value and contrast extension gain value look-up table is prepared and stored in a memory. A plurality of pixels of an image signal is received sequentially. The maximum gray scale value and a minimum gray scale value are determined in accordance with the gray scale value of each of the pixels received. A corresponding offset value and a corresponding gain value are selected, according to the maximum gray scale value and the minimum gray scale value of an image, for calculating a new gray scale value to reach the effect of contrast extension. The procedure of overflow compensation of an image signal includes the following steps. A predetermined overflow compensation look-up table, which includes a plurality of overflow compensation parameters, is stored in a memory. A plurality of pixels of an image signal is received sequentially. The pixel is judged, according to gray scale value of the received pixel, whether it is overflowed. If the pixel is judged to be overflowed, according to the gray scale value of the pixel, the corresponding overflow compensation parameter from the overflow compensation look-up table is selected to lower the gray scale value of the pixel to overcome the problem of overflow.

The advantage and spirit of the invention may be understood by the following recitations together with the appended drawings.

BRIEF DESCRIPTION OF THE APPENDED DRAWINGS

FIG. 3 is a schematic diagram of an overflow compensation look-up table when a single color is inputted according to the invention.

FIGS. 4A through 4D are schematic diagrams showing the overflow compensation calculation for the inputting of many colors.

DETAILED DESCRIPTION OF THE INVENTION

Figure 1:
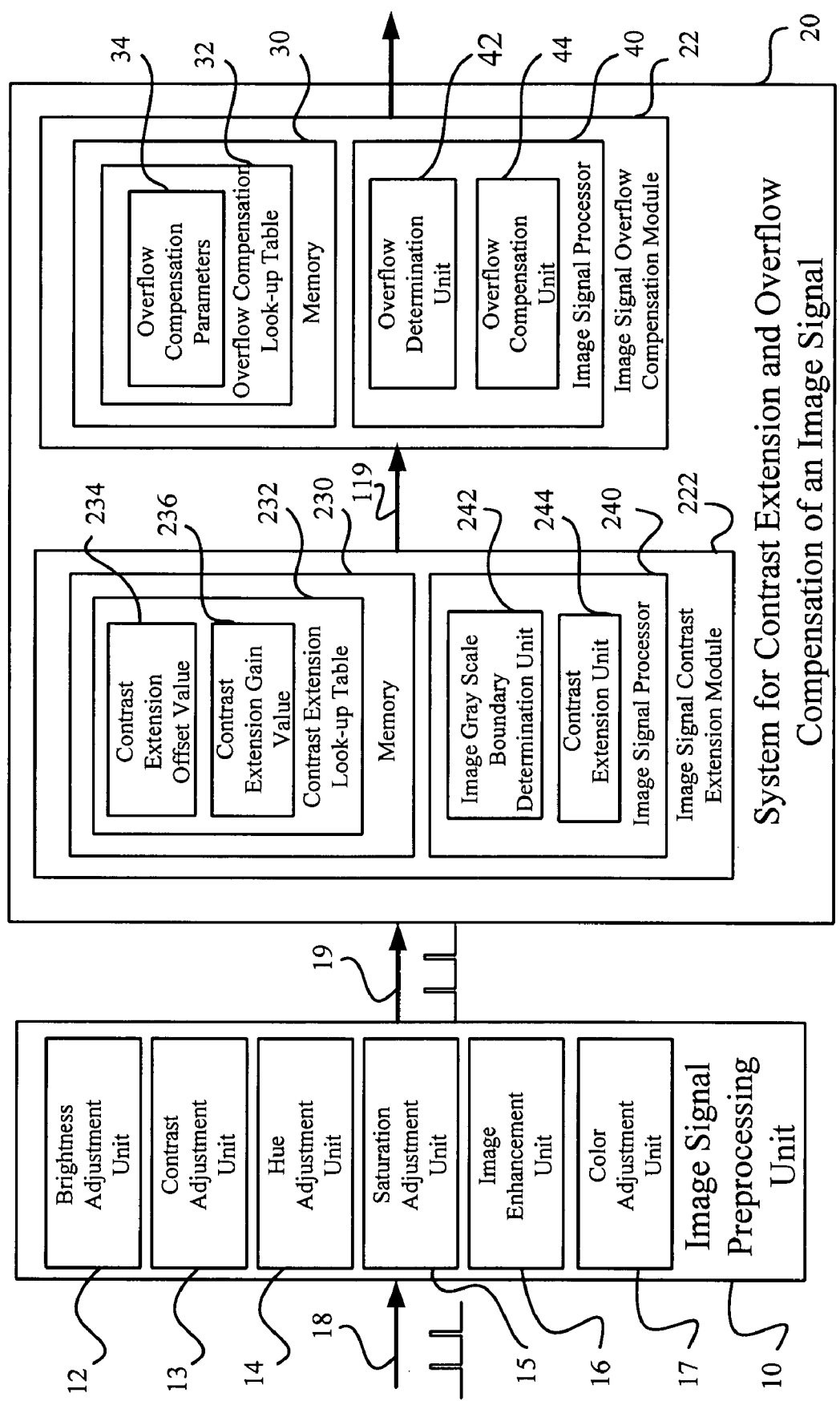
FIG. 1 is a system context diagram of the contrast extension and the overflow compensation of an image signal according to the invention.

Referring to FIG. 1, FIG. 1 is a system context diagram of the contrast extension and the overflow compensation of an image signal according to the invention. Generally speaking, after the system 20 for contrast extension and the overflow compensation of the image signal, according to the invention, is connected to an image signal preprocessing unit 10, the preprocessing image signal unit 10 is used for performing a corresponding image preprocessing function on an image 18. Usually, an image signal includes a predetermined number of bits for recording the gray scale value of the pixel. Assuming that a set of 8-bit image signals 18 are inputted into the image signal preprocessing unit 10 for increasing processing quality and precision, the set of 8-bit image signals becomes a set of 10-bit image signals 19 after the set of 8-bit image signals 18 is processed by a corresponding image signal preprocessing function and a color adjustment; however, the gray scales of the set of 10-bit images are very likely to drop or to overflow into 11 bits. Under this circumstance, the contrast extension and overflow compensation of the image signal, according to the invention, is required.

The image signal preprocessing unit 10 is used for processing and calculation. The most commonly seen image processing and calculation is on brightness, contrast, hue, saturation, image enhancement, color adjustment, and any combination of the ones described. It can also be the processing and calculation on any possible reduction or overflow of the gray scale value of the pixel. Hence, the image signal preprocessing unit 10, for example, includes a brightness adjustment unit 12, a contrast adjustment unit 13, a hue adjustment unit 14, a saturation adjustment unit 15, an image enhancement unit 16, and a color adjustment unit 17.

The system 20 for contrast extension and the overflow compensation, according to the invention, mainly includes an image signal contrast extension module 222 and an image signal overflow compensation module 22. Overall functions of the two modules can be briefly described in the following. Component properties, parameter settings, decayed transmission, decayed dissection, suppression of noisy signals, and different types of image signal processing (e.g. adjustments on brightness, contrast, hue, and saturation, image enhancement, and color adjustment processing) all affect the range of the image gray scales, causing the image gray scale not being able to completely utilize the 256 gray scales; it also causes the dynamic range of the image signal to decrease, the brightness of color levels to lower, and the contrast to be poorer. Thus, a "contrast extension" function is added after each preprocessing to expand the dynamic range of the gray scale of the image signal, so that the brightness range of the image is expanded to increase the brightness, the contrast, and the image quality. Furthermore, each type of preprocessing of the image signal (e.g. adjustments on brightness, contrast, hue, and saturation, image enhancement, and color adjustment processing) and contrast extension processing are all likely to make the image gray scale overflow, causing a large area of saturated transparency. Because the image signal exceeds the displayable gray scales, the image that has an originally distinguishable brightness and distinct color levels can no longer be distinguished. Thus, an "overflow compensation" function is needed for adjustment, making the gray scale that is originally overflowed to adequately drop, maintaining the original proportion of the three colors of the image signal, restoring the original brightness levels, and maintaining the original color correctness.

The image signal contrast extension module 222 mainly includes a memory 230 and an image signal processor 240. The memory 230 therein stores a predetermined contrast extension look-up table 232, which includes a plurality of contrast extension parameters, such as contrast extension offset values 234 and contrast extension gain values 236. The image signal processor 240, including an image gray scale boundary determining unit 242 and a contrast extension unit 244, is used for receiving an image signal 19 including a plurality of pixels and subsequently processing the pixels of the image signal 19. The pixels of the image signal 19 include a predetermined number of bits (for example, the image signal 19 is a 10-bit signal or overflowed into an 11-bit signal) for recording the gray scale value (0-1023) of the pixel. The image signal 19 can be a single-colored black-and-white image signal or a colored image signal. If the image signal 19 is a colored image signal, each of the pixels respectively includes a red, a green, and a blue gray scale value. Unless noted particularly, the specifications below use the most commonly seen color image signals as examples for illustration. The image gray scale boundary determining unit 242 is used for determining the maximum value and the minimum value of the image. The contrast extension unit 244 is used for processing the gray scale value of the image signal by contrast extension. The image gray scale boundary determining unit 242 is used for determining the pixels of the image signal, and from which determining a maximum value (MAX) and a minimum value (MIN) to calculate a difference (DIFF). After the image gray scale boundary determining unit 242 defines or determines the maximum value (MAX) and the minimum value (MIN) of the image, the contrast extension unit 244 selects, according to the maximum gray scale value and the minimum gray scale value, parameters like the corresponding contrast extension offset value 234 and the contrast extension gain value 236 from the contrast extension look-up table 232, so as to calculate the new gray scale value of each of the pixels of the image to adjust the contrast extension on the pixels to reach the effect of a contrast enhancement.

The image signal overflow compensation module 22 includes a memory 30 and an image signal processor 40. The memory 30 therein stores a predetermined overflow compensation look-up table 32, which includes a plurality of overflow compensation parameters 34. The content of the overflow compensation parameters 34 are described in details in FIG. 1 and relevant descriptions. The image signal processor 40 also includes an overflow judging unit 42 and an overflow compensation unit 44. The overflow judging unit 42 is used for judging, according to the gray scale value of the pixel, whether the pixel of the image signal 119 is overflowed. After the image signal 119 is processed by the image signal preprocessor 10 and/or the image signal contrast extension module 222, it is very likely to result in the gray scale value (for example, the gray scale value becomes 1030) of the pixel exceeding the range of the gray scale value (0-1023) defined by the predetermined number of bits (e.g. 10 bits). When the situation described above occurs, the overflow judging unit 42 judges whether the pixel is overflowed, and then the overflow compensation unit 44, according to the invention, is required to be used for compensating and adjusting the pixels of the image signal 119. The overflow judging unit 42 usually judges the level of the overflow of each of the pixels of the received image signal 119, and the overflow compensation unit 44 only adjusts the gray scale value of a pixel when the overflow judging unit 42 judges that a pixel of the image signal 119 is overflowed. The gray scale values of the other pixels, if not judged to be overflowed, remain unchanged. It is also mentioned here for the sake of convenience in FIG. 1, the memories 30 and 230 and the image signaling processors 40 and 240 are drawn separately; however, they can be combined together to execute their predetermined functions in a practical circuit under the practical considerations of cost, design, and assembling, and they not necessarily required to be separated.

When the overflow judging unit 42 judges that a pixel of the image signal 119 is overflowed, the overflow compensation unit 44 selects, according to the gray scale value of the current input pixel, the corresponding overflow compensation parameter 34 from the overflow compensation look-up table 32, so as to lower the gray scale value of the pixel to overcome the problem of overflow. In the case of a colored image signal, if one of the red, green, or blue gray scale values of a pixel exceeds the predetermined number of bits, the overflow judging unit 42 judges if the pixel is overflowed; the overflow compensation unit 44 then selects, according to the maximum among the red, green, and blue gray scale values, the corresponding overflow compensation parameter 34 from the overflow compensation look-up table 32 to proportionally lower the red, green, and blue gray scale values, so that the color performance of the pixel remains substantially the same as prior to the overflow compensation.

Figure 2:
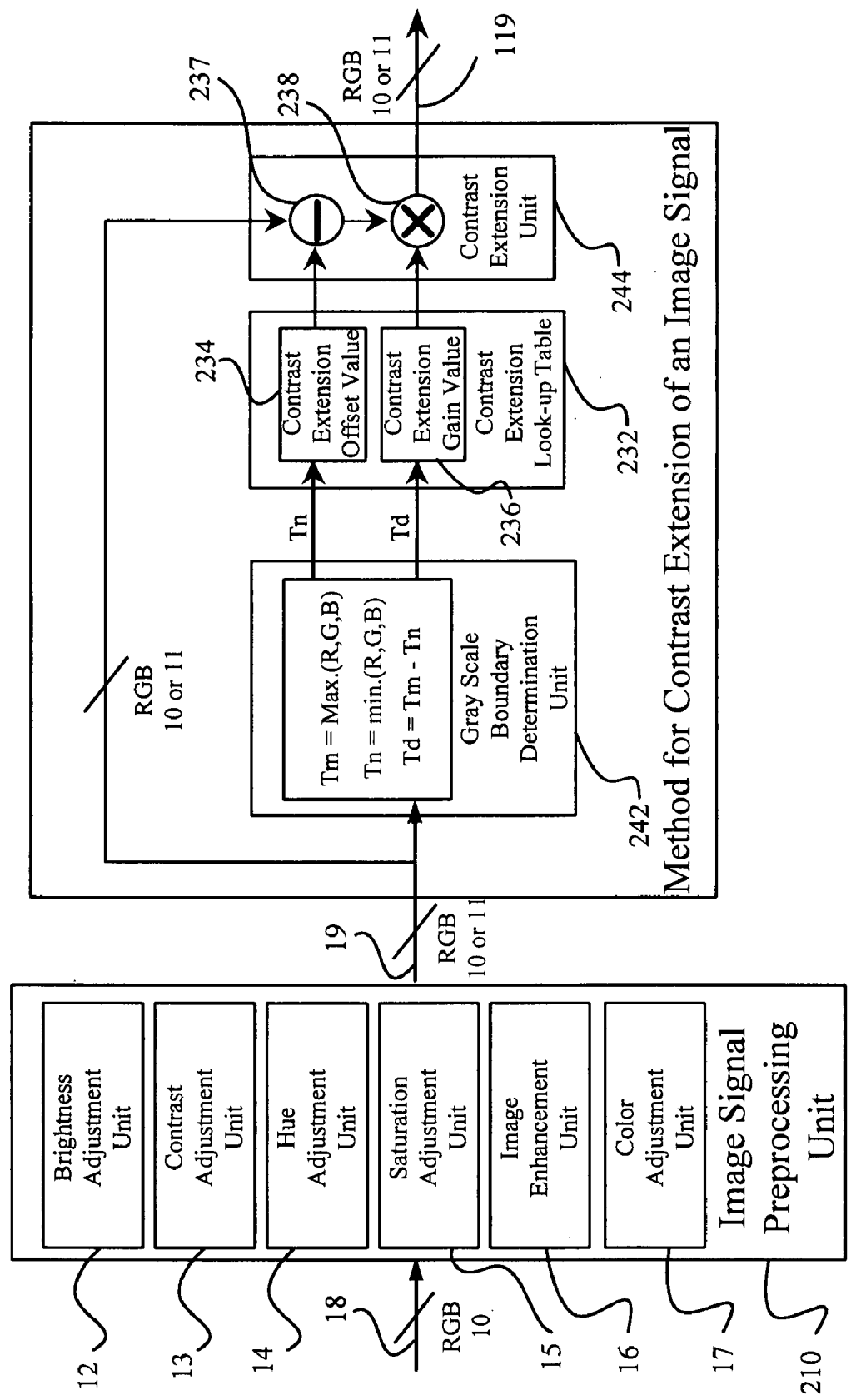
FIG. 2 is a module context diagram of a method for contrast extension according to the invention.

Referring to FIG. 2, FIG. 2 is a module context diagram of a method for contrast extension according to the invention. The method for contrast extension of an image signal, according to the invention, is usually used after the preprocessing of an image signal is completed. These functions, for example, include a brightness adjustment function, a contrast adjustment function, a hue adjustment function, a saturation adjustment function, an image enhancement function, and a color adjustment function. They are respectively performed by each corresponding unit 12-17 in the image signal preprocessor 10. In the method for contrast extension of the image signal according to the invention, the required parameters, such as a contrast extension offset value 234 and a contrast extension gain value 236, from the contrast extension look-up table 232 are first stored in the memory 230. However, the pixels of the received image signal are determined to define the maximum value (MAX) and minimum value (MIN), and a difference (DIFF) between the maximum value and the minimum value is calculated.

There are many defining methods for defining the maximum value (MAX) and the minimum value (MIN), and they can be adjusted according to practical situations. For example, the maximum among the gray scale values of all of the pixels of the image signal can be used as the maximum value (MAX), whereas the minimum among the gray scale values of all of the pixels of the image signal can be used as the minimum value (MIN). In order to avoid interruption by noisy signals, another method can be performed to first truncate the maximum and minimum among the gray scale values of all the pixels of the image signal, and the gray scale values of all of the remaining pixels of the image signal can form a histogram. Thus, the average value of the top 5% of the gray scale values is the maximum value (MAX), whereas the average value of the bottom 5% of the gray scale values is the minimum value (MIN).

Then, the contrast extension look-up table 242 is looked up in accordance with the minimum value (MIN) and the difference (DIFF), and the corresponding contrast extension gain value and the corresponding contrast extension offset value are selected. Afterwards, the contrast extension on each of the pixels of the image signal 19 is adjusted according to the following formula: gray scale value of the adjusted pixel=a selected corresponding contrast extension gain value*(a raw gray scale value of the pixel−a selected corresponding contrast extension offset value).

Using an embodiment of the invention as a specification, the image gray scale boundary determining unit 242 determines the maximum and the minimum of the image signal 19 received sequentially (or to truncate the maximum gray scale value and the minimum gray scale value, and to adapt the values of the bottom 5% and the top 5% of the histograms to avoid interruption by noisy signals) to confirm the maximum gray scale value, Tm, and the minimum gray scale value, Tn, of an image and to calculate their difference Td=Tm−Tn. The corresponding contrast extension offset value 234 and the contrast extension gain value 236, according to the Tn value and Td value, is looked up from the contrast extension look-up table 232. The raw gray scale values of all of the pixels of the images are subtracted by the looked-up offset value 234, and differences are then multiplied by the looked-up gain value 236 to complete the process of contrast extension on the image signal. The subtractions and multiplications here can be calculated by using a subtractor 237 and a multiplier 238 of the contrast extension unit 244. Hence, a contrast-extended image signal 119 can be obtained.

Using an 8-bit image as an example, if the image gray scale boundary determining unit 242 confirms that the Tm value and Tn value of the image are 200 and 30 respectively, then Td is 170. If the offset value and the gain value of the image are 10 and 1.2 respectively after looking up the look-up table, then the new gray scale is Gray'=Gain*(Gray−Offset). The gray scale value of each of the pixels of the image is calculated using the formula to obtain a new gray scale value.

Hence, the raw ratio is 200/30 (=6.67), and the new ratio is 228/24 (=9.5). The ratio is increased by as much as 42.5%. The stored offset value 234 and gain value 236 in the contrast extension look-up table 232 can be adjusted flexibly in accordance with practical needs when using the display. The only thing that needs to pay attention to is that the value should only be adjusted adequately to avoid unreality caused by over-extension of the image.

Referring to FIG. 3, FIG. 3 is a schematic diagram of an overflow compensation look-up table 32 when a single color is inputted according to the invention. In FIG. 3, the overflow compensation look-up table stored in the memory 30 can include a plurality of columns for recording different overflow compensation parameters. The overflow compensation parameters here are used for expressing a generic term, and the embodying specification of the generic term can be overflow compensation parameters, output gray scale values, or the combination thereof. In the overflow compensation look-up table 32, the column 35 "current input gray scale value (11-bits) (P)", the column 36 "overflow compensation gain value", and column 38 "compensated output gray scale value (10-bits) (P*Gain)" are typical columns shown in FIG. 2. These columns can be added or partially abbreviated in regards to practical needs. As long as the function of overflow compensation can be achieved, there are no fixed formats. For the sake of convenience in illustrating the embodiment, the column 33 "current input gray scale value (8-bit)", the column 31 "raw output gray scale value (10-bit)", and the column 37 "compensated output gray scale value (18-bit) (P*Gain)" are added. In practice, for the sake of saving capacity of the memory 30, the columns are not necessarily required; thus, the function and the effect of the invention is totally unaffected if they are abbreviated.

The overflow compensation gain value differs by the extent of the overflow of the corresponding pixel. In equivalence, the gain value lower than 1.0 causes the output gray scale value to drop after the input gray scale value with saturated overflow is multiplied by the gain value lower than 1.0. Besides using the overflow compensation gain value, the relationship between the current input gray scale value and the compensated corresponding output gray scale value can be directly defined in the overflow compensation look-up table 32, wherein the corresponding output gray scale value can be obtained by experiments first. That is, the ranges of the input gray scales which can generate saturated overflows are found first by experiments (such as 1024-1031 and 1032-1036 shown in FIG. 2), and overflow compensation calculations are performed on different input gray scale values. The overflow compensation gain value (254/256) is selected by the range of the input gray scale value (1024/1031) in the first stage, thus obtaining the corresponding output gray scale value range (1016.0-1022.9); then, the overflow compensation gain value (252/256) is selected by the range of the input gray scale value (1032-1036) in the second stage; thus, the range of the corresponding output gray scale value is (1015.9-1019.8). The relationship between input and output, as shown in FIG. 3, is obtained by selecting different compensation gain values using dissecting. This is a nonlinear correlation, and the advantage of such is that the output level in each section becomes more distinct. If this consideration is not important in a practical embodiment of the invention, the same overflow compensation value can be easily selected without dissecting to obtain the linear output gray scale value corresponding to a linearity. Under the premise of not violating the spirit of the invention, how to obtain the relationship between input and output depends on how many ways and how much flexibility an individual case needs to lower the maximum input gray scale value, which generates a saturated overflow, to fall within a predetermined number of bits of the image signal, so as to effectively overcome the problem of overflow and to restore the original brightness level of the image.

Referring to FIGS. 4A through 4D, FIGS. 4A through 4D are schematic diagrams showing the overflow compensation calculation of the inputting of many colors. For a color display system, color correctness is very important. Traditional overflow processing only compensates the color of the overflow, and this causes the proportion of the three basic colors to differ from the proportion of the original three colors, which causes abnormality in colors. The method for overflow compensation of an image, according to the invention, processes the three colors of the same pixel in the same way, so that the proportion of the three colors prior to or after the processing will not change. Besides restoring the original brightness levels, a correct color performance can also be ensured.

Figures 4B, 4C, 4D:
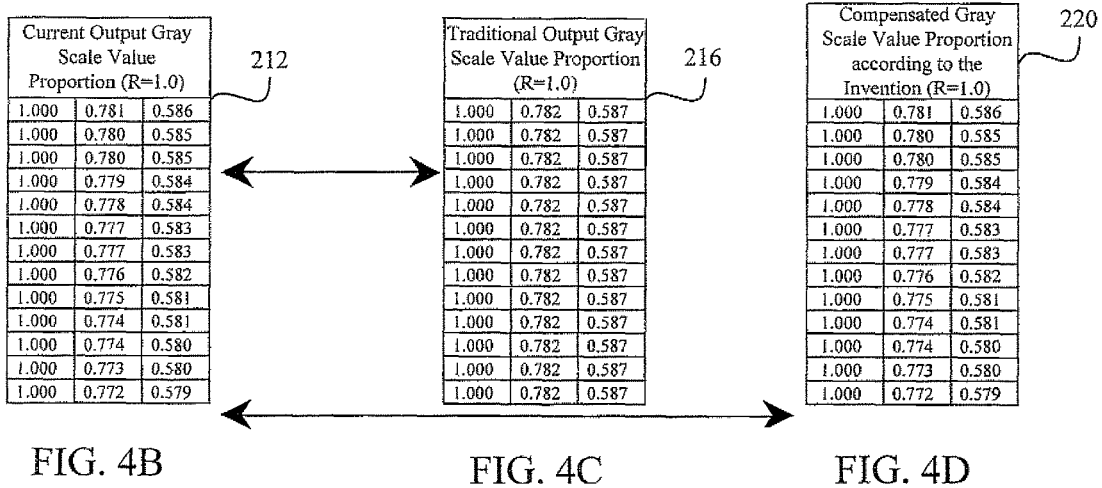

The columns shown in FIG. 4A include the column 202 "current input gray scale value (11-bit) (P)", the column 204 "current input gray scale value (8-bit) (P)", the column 206 "traditional output gray scale value (10-bit)", the column 208 "overflow compensation gain value", and the column 210 "compensated output gray scale value according to the invention (P*Gain) (10-bit)". The column 202 in FIG. 4A shows the current image signal with the three inputted colors (R, B, G) and the corresponding maximum value (MAX) (In this case, it is the image signal R). After each row of signals is normalized using the image signal R as a denominator, all of the image signals R become 1. The image signal G and the image signal B are calculated proportionally; thus, the "current output gray scale proportion (R=1.0)" in FIG. 4B is 212. The column 204 and the column 202 in FIG. 4A are similar, but they differ from each other in that the current input gray scale value is 8 bits. When the image signal R in the column 202 exceeds the maximum upper limit of the 10 bits, the image signal R is directly set to the maximum upper limit value (1023) in accordance with the prior art. The image signal G and the image signal B do not exceed the maximum upper limit of the 10 bits, so they remain unchanged. Similarly, after a normalized calculation is performed, the result can be shown in the column 216 "traditional output gray scale value proportion (R=1.0)" in FIG. 4C. The overflow compensation gain value, according to the invention, can be shown in the column 208 after calculation. The column 210 "compensated output gray scale value according to the invention (P*Gain) (10-bit)" can be obtained by calculating a set of gain values with the "current input gray scale values (P)" in the column 202. Similarly, after a normalized calculation, the result can be shown in the column 220 "compensated output gray scale value proportion according to the invention" in FIG. 4D. It can be observed through FIGS. 4A-4D that when there is an overflow, according to prior art, the proportion of the three outputted colors differs from the raw gray scale proportion, causing color deviations. This invention made an improvement to the situation, so that when there is an overflow, the proportion of the three colors outputted by image signal overflow compensation method, according to the invention, has the same proportion as the raw gray scale proportion. Thus, color deviations will not occur.

Figure 5:
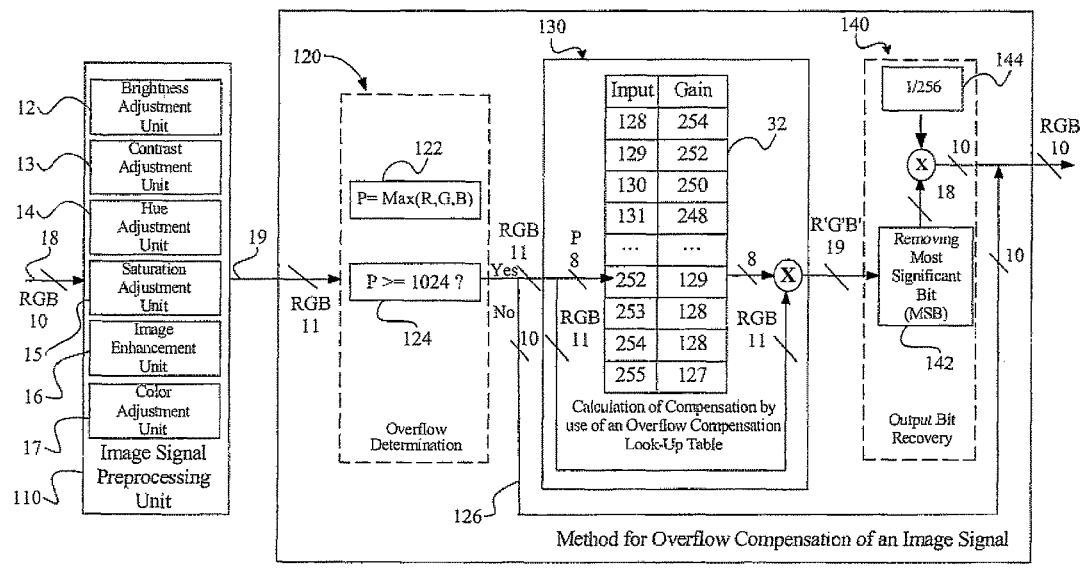
FIG. 5 is a module context diagram of the method for overflow compensation according to the invention.

Referring to FIG. 5, FIG. 5 is a module context diagram of the method for overflow compensation according to the invention. The rationale of the method for overflow compensation, according to the invention, is to multiply the gray scale value of an pixel, which is saturated and overflowed, by a gain value lower than 1.0, so that the output gray scales are lowered; furthermore, the gain value can be different according to the different values of the gray scale value of the pixel, so that image which is originally saturated and overflowed and displays the highest gray scales, can be restored to its original gray scales and brightness levels.

Image signals include two main parts: brightness and color. Any single pixel is a combination of different basic colors in unique proportions (for example, most displays use RGB as basic colors, whereas most printers use CMYK as basic colors). The color performances (RGB or CMYK proportions) of the pixels are ruined if processing is done according to a single gray scale value of an overflowed basic color. Thus, in order to maintain color correctness, the overflow compensation of the image signal, according to the invention, is processed on the gray scale values of all of the basic colors of each of the pixels, so that each basic color can still maintain the original proportion of the brightness of the gray scale, and the color performance remains substantially the same as the original signals.

Using a 10-bit image signal having RGB as basic colors as an example, the compensation method for overflow of an image signal, according the invention, can be illustrated in the following with cross-referencing to FIG. 5:

Step 110: Image signal preprocessing. There are several reasons which cause overflow in gray scale values of pixels of an image signal. For example, the image signal is possibly processed through a brightness adjustment, a contrast adjustment, a hue adjustment, a saturation adjustment, an image enhancement, a color adjustment, or any combination among these processes, or any other processing and calculation which can cause the gray scale value of a pixel to overflow.

Step 120: Overflow judgment. The gray scale value of a 10-bit image must fall between 0 (the binary expression is 0000000000) and 1023 (1111111111), and after preprocessing by the image signal preprocessor 110, the 10-bit image can be 10 bits or 11 bits. Only when the pixel of the image signal is overflowed does the gray scale value of the overflowed image is lowered by using the method according to the invention. The gray scale values of the pixels which are not overflowed remain unchanged. Thus, step 122 must be performed first to find the maximum value P (P=MAX (R, G, B) among the RGB colors. Then, step 124 is performed to judge if P is overflowed (exceeding 10 bits). If P is not overflowed, the gray scale value of the pixel remains unchanged and is directly outputted through the signaling route 126. If P is greater or equal to the gray scale 1024 (10000000000), it indicates that the gray scale value of the pixel is overflowed to greater than 10 bits, and then the overflow compensation look-up table 32 is used for calculating the compensation.

Step 130: Using an overflow compensation look-up table to calculate compensations. The image signal that has gone through step 120 must be 11 bits. That is, the highest significant bits (HSB) must be 1. In order to save the capacity of the memory used by the overflow compensation look-up table 32, only 8 bits from the HSB are used for looking up the overflow compensation look-up table 32. Therefore, the input of the overflow compensation look-up table 32 is from 128 (10000000) to 255 (11111111). Assuming that the corresponding output gain value shown in FIG. 4 (for the sake of increasing precision and considering digital calculations, the overflow compensation gain value that is originally smaller than 1.0 is magnified 256 times, so the final result is divided by 256), when the gray scale value of one of the basic colors of the displayed pixel is overflowed, the maximum gray scale value P of all basic colors is used to look up the corresponding overflow compensation gain value from the look-up table and to multiply the RGB gray scale value of the image signal by this overflow compensation gain value. Thus, after an overflow calculation, the original gray scale value of the RGB of the overflowed image pixel becomes:

$R'=R*Gain;$ $G'=G*Gain;$ $B'=B*Gain:$

In this case, R', G' and B' are obtained by multiplying the 11-bit image gray scale value with the 8-bit overflow compensation gain value. Thus, the gray scale value after calculation in step 130 is 19 bits.

The step 140: Output bits restoration. Although the image gray scale value after calculation in step 130 is 19 bits, the image gray scale value is already multiplied by an overflow compensation gain value lower than 1.0 (but magnified 256 times), so the image gray scale value must be smaller than 262144 (=2^18), as shown in the column 37 "compensated output gray scale value (18-bit) (P*Gain)" in FIG. 3. Thus, in step 142, the HSB of the 19-bit image gray scale value image is directly truncated to become an 18-bit image. Because the overflow compensation gain value is magnified 256 times in step 130, step 144 is performed, and then 256 ($2^8$) is divided. In mathematical calculations, the step can be achieved by truncating the lowest 8 bits of the gray scale value of the image, so that the gray scale value of the image is restored to the 10-bit information prior to overflow compensation. It can be seen clearly from FIG. 3 and FIG. 6 that the output of the gray scale values 1024-1036 (the column 35 and the symbol label 52), which are originally overflowed, are all 1023 (the column 31 and symbol label 54), if the invention is not used for performing an overflow compensation. This causes the original gray scale levels to be indistinguishable. But after using the invention to perform an overflow compensation, the originally overflowed gray scale values 1024-1036 fall into the range between 1015 to 1023 (the column 38 and the symbol label 56), so that the original gray scales, brightness levels, and color performance can be restored.

Figure 6:
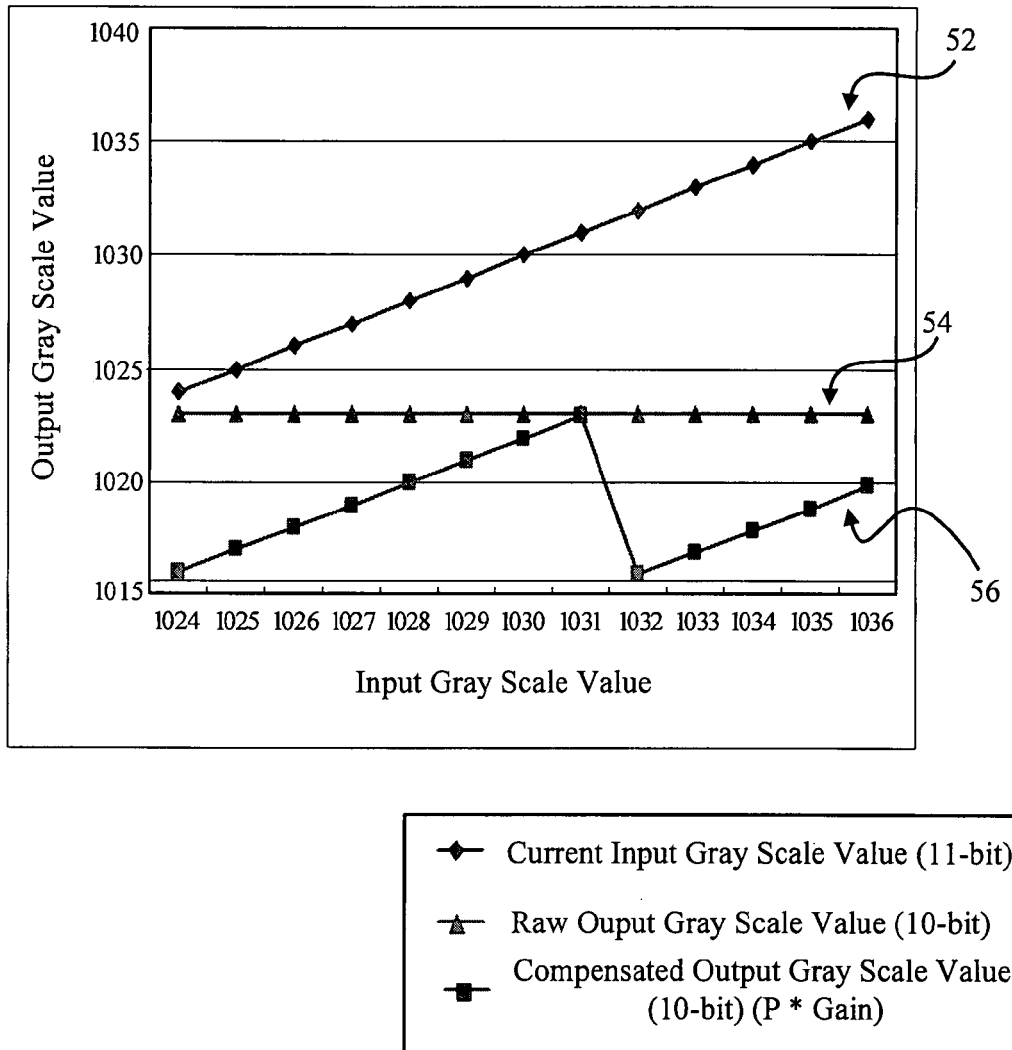
FIG. 6 is a schematic diagram of the result of the overflow compensation calculation when a single color is inputted according to the invention.

Referring to FIG. 6, FIG. 6 is a schematic diagram of the result of the overflow compensation calculation when a single color is inputted according to the invention. FIG. 6 uses a diagram to show the results of different input gray scale values in FIG. 3 by an overflow compensation calculation. The symbol label 52 represents "current input gray scale value (11-bit) (P)" to generate the range of input gray scale values (1024-1036) of an image, which is saturated and overflowed, as an example for illustration. The symbol signal 54 shows "original output gray scale value (10-bit)". That is, before using the method for overflow compensation of this invention, if the input gray scale values fall into the range of 1024-1036, their output gray scale values (10-bit) are all equal to 1023, and if the pixels are distributed so that they are concentrated in certain areas in the image, then these areas become transparent in a large area, causing a poor image quality. The symbol label 56 represents "compensated output gray scale value (10-bit) (P*Gain)". That is, after using the method for overflow compensation, according to the invention, if the input gray scale value falls into the ranges of 1024-1031 and 1032-1036, the output gray scale values are respectively lowered to fall into the ranges of 1016.0-1022.9 and 1015.9-1019.8. Even if the pixels are distributed so that they are concentrated in certain areas of the image, the brightness levels of these areas of the original image can be restored, instead of showing a large area of transparency prior to compensation.

Figure 7:
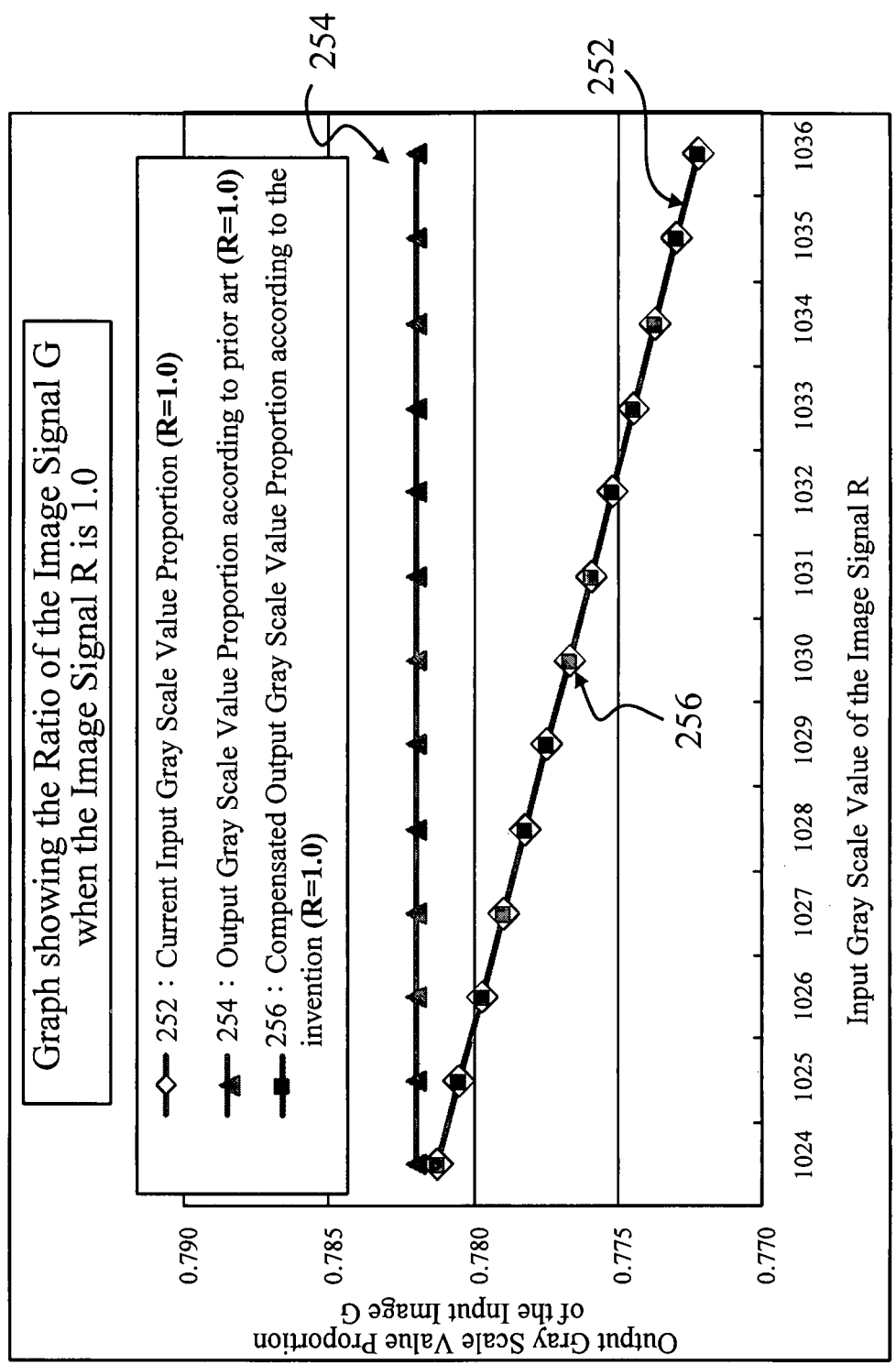
FIG. 7 is a schematic diagram of the result of the proportion of three colors prior to and after overflow compensation calculation on the three inputted colors.

Referring to FIG. 7, FIG. 7 is a schematic diagram of the result of the proportion of three colors prior to and after overflow compensation calculation on the three inputted colors. As shown in FIG. 7, the result of the proportion of the image signal G using the image signal R as 1.0, prior to or after overflow compensation calculation on the three inputted colors, is drawn in a diagram. To draw a diagram on the image signal G from the result in FIG. 4D, the horizontal axis represents the input gray scale value of the image signal R, and the vertical axis represents the proportion of the output gray scale value of the image signal G. The curve 252 represents the current proportion of the input gray scale value (R=1.0). The curve 254 represents the proportion of the output gray scale value (P=1.0) according to prior art. The curve 256 represents the proportion of the compensated output gray scale value (R=1.0) according to the invention. Based on the combining of the curve 252 and the curve 256, the proportion of the G color in the overflow compensation method, according to the invention, is completely identical to the raw data. Hence, the method can ensure that the proportion of each color is the same as the original signal. It is obvious to see from the difference between the curve 254 and the curve 252 that the G color proportion, according to prior art, differs from the raw data; thus, color deviations may occur.

Figure 8:
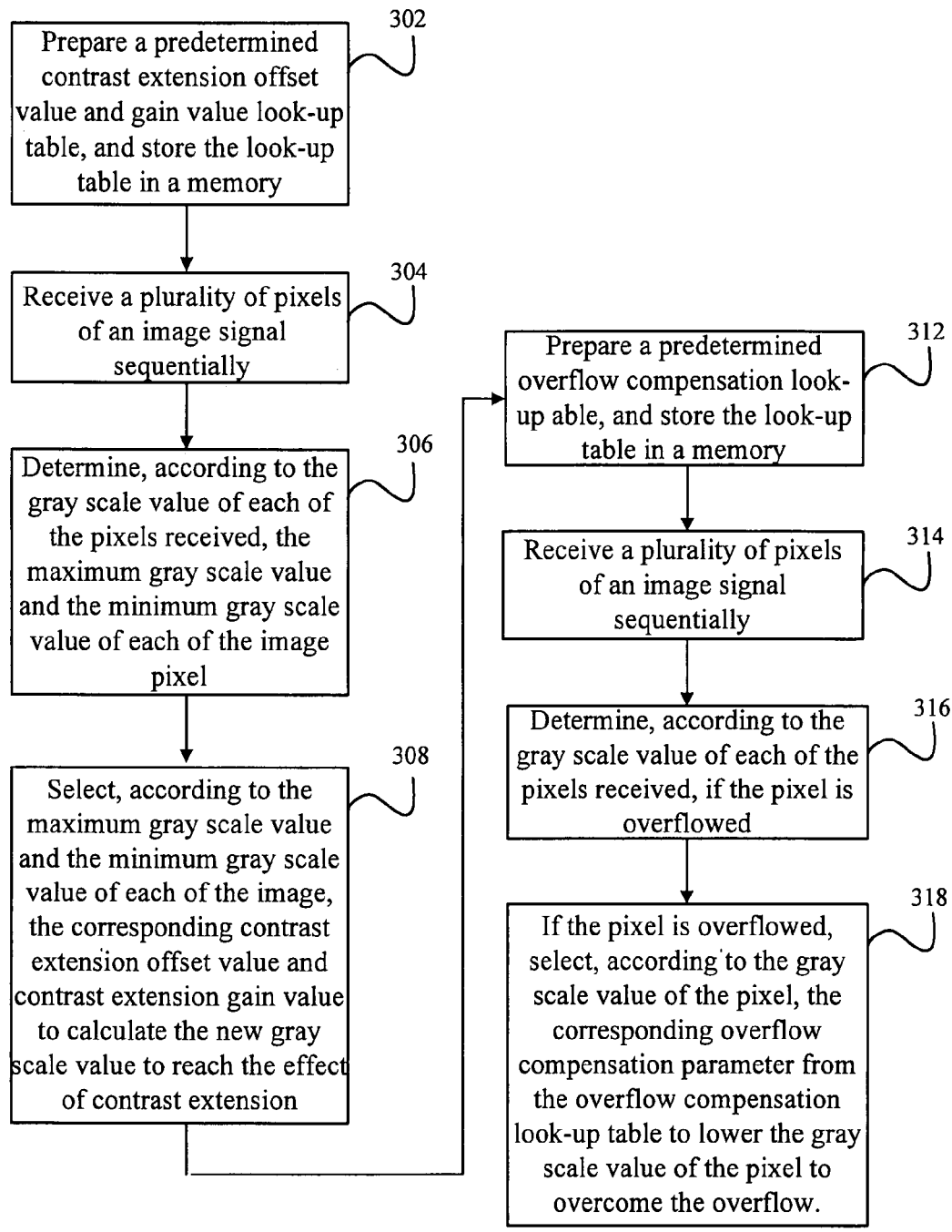
FIG. 8 is a flowchart of the method for contrast extension and overflow compensation of an image signal.

Referring to FIG. 8, FIG. 8 is a flowchart of the method for contrast extension and overflow compensation of an image signal. If the specification described above is further illustrated by a simple way, the method for contrast extension and overflow compensation of an image signal, according to the invention, can be summarized into two main parts: contrast extension and overflow compensation.

The contrast extension part of an image signal includes the following important steps:

Step 302: Preparing a predetermined contrast extension offset value and gain value look-up table, and storing it in a memory.

Step 304: Receiving a plurality of pixels of an image signal sequentially.

Step 306: Determining, according to the gray scale value of each of the received pixels of the image, the maximum gray scale value and the minimum gray scale value of each image.

Step 308: Selecting, according to the maximum gray scale value and the minimum gray scale value of each image, the corresponding offset value and gain value from the contrast extension look-up table to calculate a new gray scale value, so as to reach the effect of contrast extension.

The overflow compensation part for an image signal includes the following important steps:

Step 312: Preparing a predetermined overflow compensation look-up table, and storing it in a memory.

Step 314: Receiving a plurality of pixels of an image signal sequentially.

Step 316: Judging, according to the gray scale value of each of the received pixels, whether the pixel is overflowed.

Step 318: If the pixel is overflowed, the corresponding overflow compensation parameter from the overflow compensation look-up table is selected, according to the gray scale value of the pixel, to overcome the problem of overflow.

Compared with prior art, the characteristic of the invention can be analyzed in the following:

The gray scale range of an image is extended to the maximum gray scale range of 0-255 by contrast extension. The biggest goal is to increase the dynamic range of the distribution of the gray scales of the image to increase image contrast in visual effects.

An overflow compensation look-up table and a set of gain values lower than 1.0 established in the overflow compensation look-up table are used to reach the function of overflow compensation. If a pixel is judged to be overflowed, the overflow compensation module selects, according to the gray scale value of the pixel, the corresponding overflow compensation parameters to lower the gray scale value of the pixel to overcome the problem of overflow.

A substantial amount of flexibility, according to the invention, is kept for how to define overflow compensation parameters and for establishing an overflow compensation look-up table. The overflow gain parameters can be overflow compensation gain values, output gray scale values, or any combination of the two. The columns in the overflow compensation look-up table 32 can be increased or partially abbreviated, in regards to practical needs. As long as the overflow compensation can be achieved, there are no fixed formats. Furthermore, in order to save the capacity of the memory 30 in practice, unnecessary columns can be further abbreviated without affecting the function and the effect of the invention at all.

A substantial amount of flexibility, according to the invention, is also kept for deciding how to use the overflow compensation look-up table and the overflow compensation parameters. The overflow compensation module looks up, according the gray scale value of the overflowed image, from the overflow compensation look-up table and the corresponding overflow compensation parameter to adjust the gray scale value of the pixel. The overflowed gray scale value and the corresponding overflow compensation gain value can be multiplied by each other, and an output bits restoration is performed by the method for lowering compensation, so that the image, which is originally saturated and overflowed and displays the highest gray scale, is restored to its original gray scales and brightness levels.

The overflow compensation, according to the invention, judges and compensates the overflow of each of the pixels of the image pixel respectively, so that each basic color can still maintain the original gray scale brightness proportion to ensure that the color performance is the same as the original signal.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image signal processing system, which is connected to an image signal preprocessing unit comprising a brightness adjustment unit, a contrast adjustment unit, a hue adjustment unit, a saturation adjustment unit, an image enhancement unit, a color adjustment unit, or any combination therebetween for performing a preprocessing function on an image signal comprising a plurality of pixels, comprising:

a predetermined contrast extension look-up table comprising a plurality of contrast extension parameters, wherein the contrast extension parameter comprises at least one contrast extension offset value and at least one contrast extension gain value;

an image gray scale boundary determining unit for determining the pixels of the image signal to define a maximum value and a minimum value thereamong and to calculate a difference between the maximum value and the minimum value;

a contrast extension unit for looking up the contrast extension look-up table, and selecting the contrast extension parameters corresponding to the minimum value and the difference to adjust contrast extension on the pixels of the image signal, wherein the contrast extension unit adjusts the contrast extension parameter on the pixel of the image signal according to the following formula:

> gray scale value of an adjusted pixel=a selected contrast extension gain value corresponding to the adjusted pixel*(the gray scale value of the pixel−a selected contrast extension offset value corresponding to the adjusted pixel);

a memory for storing a predetermined overflow compensation look-up table comprising a plurality of overflow compensation parameters; and an image signal processor for receiving the image signal and processing the pixels of the image signal, wherein each of the pixels comprises a predetermined number of bits for recording gray scale value thereof, and the image signal processor comprises:

an overflow judging unit for judging whether the pixel is overflowed according to the gray scale value of the pixel, wherein it is determined that the pixel is overflowed when the gray scale value of the pixel exceeds the predetermined number of bits after the image signal is processed by the image signal preprocessing unit or is adjusted by the contrast extension unit; and an overflow compensation unit for compensating the pixels of the image signal;

wherein, when the overflow judging unit judges that one of the pixels of the image signal is overflowed, the overflow compensation unit selects the overflow compensation parameter corresponding to the gray scale value of the overflowed pixel from the overflow compensation look-up table to lower the gray scale value of the overflowed pixel to overcome the overflow.

2. The image signal processing system of claim 1, wherein the image gray scale boundary determining unit defines the maximum value and the minimum value according to the following formulas:

> the maximum value=a maximum value among the gray scale values of all of the pixels of the image signal; and
>
> the minimum value=a minimum value among the gray scale values of all of the pixels of the image signal.

3. The image signal processing system of claim 1, wherein the image gray scale boundary determining unit first truncates the maximum value and the minimum value among the gray scale values of all of the pixels of the image signal, and then defines the maximum value and the minimum value according to the following formulas:

> the maximum value=an average value of top 5% of the gray scale values of all the remaining pixels of the image signal after being truncated; and
>
> the minimum value=an average value of bottom 5% of the gray scale values of all the remaining pixels of the image signal after being truncated.

4. An image signal processing method, which is applied to an image signal processing system comprising a memory for storing a predetermined overflow compensation look-up table comprising a plurality of overflow compensation parameters, comprising the steps of:

receiving a plurality of pixels of an image signal sequentially;

judging whether the pixel is overflowed according to the gray scale value of each of the received pixels;

selecting, when it is judged that the pixel is overflowed, the overflow compensation parameter corresponding to the gray scale value of the overflowed pixel from the overflow compensation look-up table to lower the gray scale value of the overflowed pixel to overcome the overflow;

pre-storing a contrast extension look-u table in said memo wherein said contrast extension look-up table comprises a plurality of contrast extension parameters;

judging the pixels of the image signal to define a maximum value and a minimum value and to calculate a difference between the maximum value and the minimum value; and looking-up the contrast extension look-up table and selecting the contrast extension parameter corresponding to the minimum value and the difference to adjust the contrast extension on the pixels, wherein the contrast extension parameter comprises at least one contrast extension offset value and at least one contrast extension gain value, and the contrast extension on a pixel of the image signal is adjusted according to the following formula:

> gray scale value of an adjusted pixel=a selected contrast extension gain value corresponding to the adjusted pixel*(the gray scale value of the pixel−a selected contrast extension offset value corresponding to the adjusted pixel).

5. An image signal processing system, which is connected to an image signal preprocessing unit comprising a brightness adjustment unit, a contrast adjustment unit, a hue adjustment unit, a saturation adjustment unit, an image enhancement unit, a color adjustment unit, or any combination therebetween for performing a preprocessing function on an image signal comprising a plurality of pixels, comprising:

a predetermined contrast extension look-up table comprising a plurality of contrast extension parameters;

an image gray scale boundary determining unit for determining the pixels of the image signal to define a maximum value and a minimum value thereamong, and to calculate a difference between the maximum value and the minimum value;

a contrast extension unit for looking up the contrast extension look-up table, and selecting the contrast extension parameters corresponding to the minimum value and the difference to adjust contrast extension on the pixels of the image signal;

a memory for storing a predetermined overflow compensation look-up table comprising a plurality of overflow compensation parameters; and an image signal processor for receiving the image signal and processing the pixels of the image signal, wherein each of the pixels comprises a predetermined number of bits for recording gray scale value thereof, and the image signal processor comprises:

an overflow judging unit for judging whether the pixel is overflowed according to the gray scale value of the pixel, wherein it is judged that the pixel is overflowed when the gray scale value of the pixel exceeds the predetermined number of bits after the image signal is processed by the image signal preprocessing unit or is adjusted by the contrast extension unit; and an overflow compensation unit for compensating the pixels of the image signal;

wherein, when the overflow judging unit judges that one of the pixels of the image signal is overflowed, the overflow compensation unit selects the overflow compensation parameter corresponding to the gray scale value of the overflowed pixel from the overflow compensation look-up table to lower the gray scale value of the overflowed pixel to overcome the overflow; and wherein each of the pixels of the image signal respectively comprises a red, a green, and a blue gray-scale value and, when one of the red, the green or the blue gray-scale values exceeds the predetermined number of bits, the overflow judging unit judges that the pixel is overflowed, and the overflow judging unit then selects the overflow compensation parameter corresponding to the overflowed pixel from the overflow compensation look-up table according to the maximum among the red, the green and the blue gray scale values of the overflowed pixel, so as to proportionally lower the red, the green and the blue gray scale values of the overflowed pixel.

6. An image signal processing method, which is applied to an image signal processing system comprising a memory for storing a predetermined overflow compensation look-up table comprising a plurality of overflow compensation parameters, comprising the steps of:

receiving a plurality of pixels of an image signal sequentially;

judging whether the pixel is overflowed according to the gray scale value of each of the received pixels;

selecting, when it is judged that the pixel is overflowed, the overflow compensation parameter corresponding to the gray scale value of the overflowed pixel from the overflow compensation look-up table to lower the gray scale value of the overflowed pixel to overcome the overflow;

pre-storing a contrast extension look-up table in said memory, wherein said contrast extension look-up table comprises a plurality of contrast extension parameters;

judging the pixels of the image signal to define a maximum value and a minimum value thereamong and to calculate a difference between the maximum value and the minimum value;

looking-up the contrast extension look-up table, and selecting the contrast extension parameter corresponding to the minimum value and the difference to adjust the contrast extension on the pixels; and truncating the maximum value and the minimum value among the gray scale values of all of the pixels of the image signal, and then defining the maximum value and the minimum value according to the following formulas:

the maximum value=an average value of top 5% of the gray scale values of all the remaining pixels of the image signal after being truncated; and the minimum value=an average value of bottom 5% of the gray scale values of all the remaining pixels of the image signal after being truncated.

7. An image signal processing method, which is applied to an image signal processing system comprising a memory for storing a predetermined overflow compensation look-up table comprising a plurality of overflow compensation parameters, comprising the steps of:

receiving a plurality of pixels of an image signal sequentially, wherein the pixel of the image signal comprises a predetermined number of bits for recording gray scale value of the pixel;

judging whether the pixel is overflowed according to the gray scale value of each of the received pixels;

selecting, when it is judged that the pixel is overflowed, the overflow compensation parameter corresponding to the gray scale value of the overflowed pixel from the overflow compensation look-up table to lower the gray scale value of the overflowed pixel to overcome the overflow, wherein the pixel is overflowed when the gray scale value thereof exceeds the predetermined number of bits;

pre-storing a contrast extension look-up table in said memory, wherein said contrast extension look-up table comprises a plurality of contrast extension parameters;

judging the pixels of the image signal to define a maximum value and a minimum value and to calculate a difference between the maximum value and the minimum value; and looking-up the contrast extension look-up table, and selecting the contrast extension parameter corresponding to the minimum value and the difference to adjust contrast extension on the pixel;

wherein each of the pixels of the image signal respectively comprises a red, a green, and a blue gray-scale value and, when one of the red, the green or the blue gray-scale values exceeds the predetermined number of bits, it is judged that the pixel is overflowed, the overflow compensation parameter corresponding to the overflowed pixel is selected from the overflow compensation look-up table according to the maximum among the red, the green and the blue gray scale values of the overflowed pixel, so as to proportionally lower the red, the green and the blue gray scale values of the overflowed pixel.

* * * * *